(12) United States Patent
Kosmowski

(10) Patent No.: US 8,735,774 B2
(45) Date of Patent: May 27, 2014

(54) FORCE REACTION COMPENSATION SYSTEM

(75) Inventor: Mark T. Kosmowski, Beaverton, OR (US)

(73) Assignee: Electro Scientific Industries, Inc., Portland, OR (US)

(*) Notice: Subject to any disclaimer, the term of this patent is extended or adjusted under 35 U.S.C. 154(b) by 1110 days.

(21) Appl. No.: 12/510,630

(22) Filed: Jul. 28, 2009

(65) Prior Publication Data

US 2010/0243622 A1 Sep. 30, 2010

Related U.S. Application Data

(60) Provisional application No. 61/164,382, filed on Mar. 27, 2009.

(51) Int. Cl.
*B23K 26/08* (2014.01)

(52) U.S. Cl.
USPC .............. 219/121.78; 219/121.82; 318/560; 318/561

(58) Field of Classification Search
USPC ............ 318/560, 561, 571, 572; 219/121.67, 219/121.68, 121.78, 121.79, 121.82
See application file for complete search history.

(56) References Cited

U.S. PATENT DOCUMENTS

| | | | |
|---|---|---|---|
| 5,363,029 A * | 11/1994 | Kimura et al. ................ 318/696 |
| 6,002,465 A * | 12/1999 | Korenaga ........................ 355/53 |
| 6,040,553 A * | 3/2000 | Ross ........................ 219/121.71 |
| 6,064,467 A | 5/2000 | Takizawa | |
| 6,408,045 B1 | 6/2002 | Matsui et al. | |
| 6,584,367 B1 * | 6/2003 | Makino et al. ................ 318/561 |
| 6,690,133 B2 * | 2/2004 | Knorr et al. ................... 318/560 |
| 7,215,095 B2 * | 5/2007 | Sekiguchi ...................... 318/560 |
| 2006/0017908 A1 | 1/2006 | Mayama | |
| 2006/0170382 A1 * | 8/2006 | Yang et al. ..................... 318/114 |
| 2006/0252261 A1 * | 11/2006 | Tanaka et al. ................. 438/662 |
| 2008/0012511 A1 * | 1/2008 | Ono ................................. 318/35 |
| 2008/0198485 A1 * | 8/2008 | Kosmowski .................. 359/811 |
| 2008/0246348 A1 * | 10/2008 | Angelis et al. .................. 310/12 |

FOREIGN PATENT DOCUMENTS

| | | | |
|---|---|---|---|
| GB | 2328636 A | * | 3/1999 |
| JP | 11-147192 A | * | 6/1999 |
| JP | 2004-304034 | | 10/2007 |
| KR | 10-1998-0081542 A | | 11/1998 |
| KR | 10-1999-0045193 A | | 6/1999 |
| KR | 10-2006-0053939 A | | 5/2006 |

OTHER PUBLICATIONS

International Search Report and Written Opinion in PCT/US10/25591 dated Oct. 7, 2010.

* cited by examiner

*Primary Examiner* — Geoffrey S Evans
(74) *Attorney, Agent, or Firm* — Young Basile Hanlon & MacFarlane P.C.

(57) ABSTRACT

A laser beam propagates along a beam axis for incidence on a work surface mounted on a support. The support operatively connects to a positioning system moving at least one of the laser beam and the target specimen relative to each other to position the laser beam at selected locations on the work surface. At least one force reaction compensation motor is located in a common force plane with, and as close as possible to, a corresponding stage motor. Any moment arm between the compensation motor and the corresponding stage motor is reduced or eliminated, allowing the compensation motor to directly couple and react to stage forces with virtually zero moment arm. Six degrees of freedom can be controlled with only four motors, since each compensation motor is directly coupled and aligned to a corresponding stage motor.

19 Claims, 8 Drawing Sheets

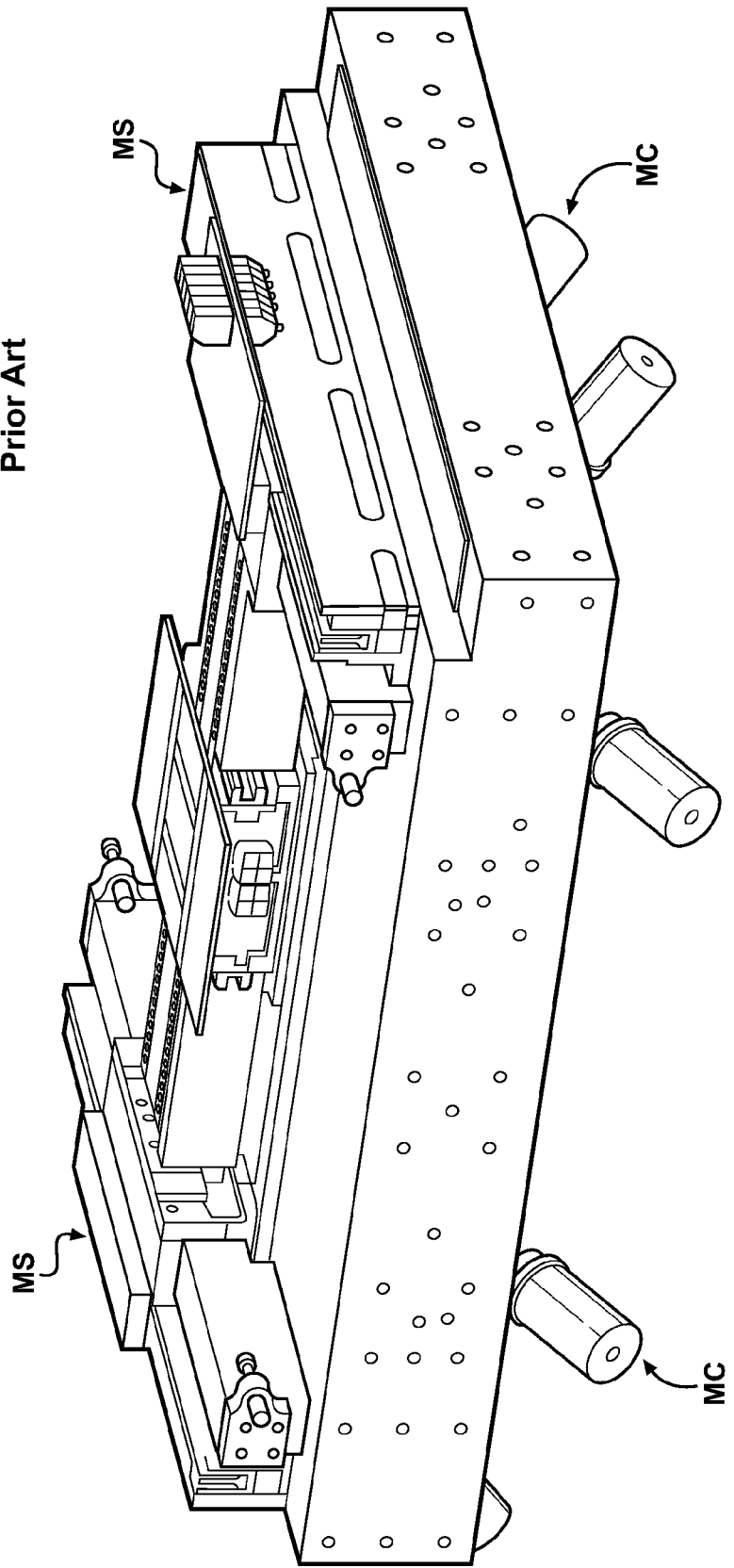

FORCE REACTION COMPENSATION SYSTEM

DESCRIPTION OF RELATED APPLICATION

This application claims priority to Provisional Patent Application Ser. No. 61/164,382, filed on Mar. 27, 2009.

FIELD OF THE INVENTION

The invention relates to a force reaction compensation system for use in a semiconductor wafer-level transport and/or processing system.

BACKGROUND

Wafer transport systems configured for use in semiconductor wafer-level processing typically include a stage having a chuck that secures the wafer for processing. Sometimes the stage is stationary, and sometimes it is moveable. Some applications require that the stage move linearly in one, two, or three Cartesian dimensions, with or without rotation. The speed of the stage motion can dictate the throughput of the entire wafer processing platform if a significant amount of the total process time is spent aligning and transporting the wafer.

For applications including optical processing, a moveable optics assembly can be mounted above the wafer surface, thereby minimizing the wafer transport distances required. The primary direction of stage motion is referred to as the "major axis," and the direction of stage motion perpendicular to the primary direction is referred to as the "minor axis." The chuck holding the specimen, here a wafer, to be processed is mounted to a major axis stage for movement along the major axis, a minor axis stage for movement along the minor axis, or in a stationary position below the major and minor axes. The major axis stage may support the minor axis stage, or they may be independent of each other.

SUMMARY

Embodiments of an improvement to a laser processing system are disclosed herein. In the laser processing system, a laser beam propagates along a beam axis for incidence on a work surface of a target specimen mounted on a support. The support is operatively connected to a positioning system having at least one stage motor that moves at least one of the laser beam and the target specimen relative to each other to position the laser beam at selected locations on the work surface. The improvement to the laser processing system includes at least one force reaction compensation motor placed in a common force plane with a corresponding stage motor, thereby reducing any moment arm between the at least one force reaction compensation motor and the corresponding stage motor and allowing the force reaction compensation motor to directly couple and react to stage forces with virtually zero moment arm.

Embodiments of another improvement to a laser processing system are also disclosed herein. In the laser processing system, a laser beam propagates along a beam axis for incidence on a work surface of a target specimen mounted on a support. The support is operatively connected to a positioning system having at least one planar stage and at least one stage motor that moves at least one of the laser beam and the target specimen relative to each other to position the laser beam at selected locations on the work surface. The improvement includes at least one disturbance-attenuation mechanism for counteracting forces exerted on the at least one planar stage by the at least one stage motor moving the planar stage. The at least one mechanism is placed in a common force plane with a corresponding stage motor, and as close as possible to the corresponding stage motor, thereby reducing any moment arm between the at least one mechanism and the corresponding stage motor and allowing the at least one mechanism to directly couple and react to stage forces with virtually zero moment arm.

Embodiments of an improvement to a laser processing method are disclosed herein. In the laser processing method a laser beam propagates along a beam axis for incidence on a work surface of a target specimen mounted on a support. The support is operatively connected to a positioning system having at least one stage motor that moves at least one of the laser beam and the target specimen relative to each other to position the laser beam at selected locations on the work surface. The improvement to the laser processing method includes locating at least one force reaction compensation motor in a common force plane as a corresponding stage motor, thereby reducing any moment arm between the at least one force reaction compensation motor and the corresponding stage motor and allowing the at least one force reaction compensation motor to directly couple and react to stage forces with virtually zero moment arm.

Details and variation of these and other embodiments of the invention are described in additional detail in the following description and accompanying drawings.

BRIEF DESCRIPTION OF THE DRAWINGS

The description herein makes reference to the accompanying drawings wherein like reference numerals refer to like parts throughout the several views, and wherein:

FIG. 7 is an illustration of force compensation motor locations on commercially-available stage designs.

DETAILED DESCRIPTION

Figure 1:
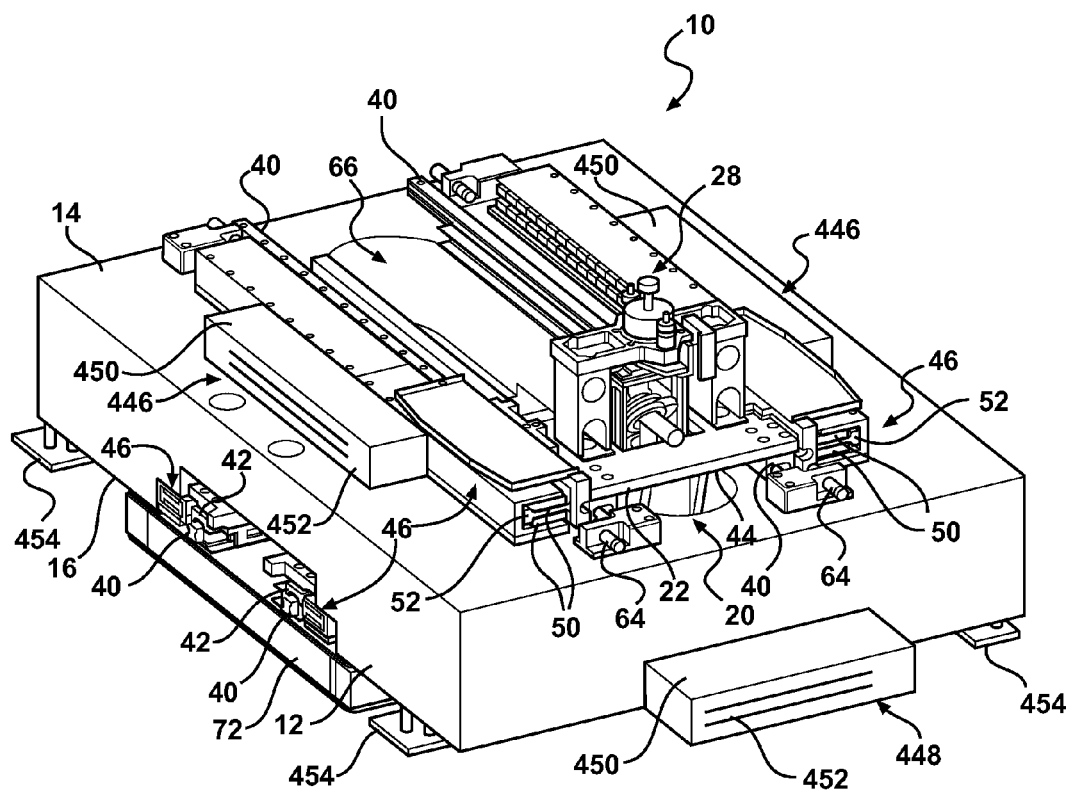
FIG. 1 is an isometric view of a force reaction compensation system according to one embodiment of the invention.

Stage design of optical systems is becoming more critical as electrical circuit dimensions shrink. One stage design consideration is the impact of process quality stemming from vibrational and thermal stability of the wafer chuck and optics assembly. In a case in which a laser beam position is continually adjusted, state-of-the-art structures support the laser assembly to maintain the required level of precision. As circuit dimensions shrink, particle contamination becomes of greater concern.

Known force reaction compensation systems use six or more motors mounted to the base of the stage frame to counteract the forces exerted on the system frame by the stages. This results in a complicated and costly structural assembly with increased maintenance costs.

A split-axis stage architecture can be implemented as a multiple stage positioning system that supports a laser optics assembly and a workpiece having a surface on which a laser beam is incident for laser processing. The multiple stage positioning system is capable of vibrationally and thermally stable material transport at high speed and rates of acceleration. A split-axis design decouples driven stage motion along two perpendicular axes lying in separate, parallel planes. In one example, motion in the horizontal plane is split between a specimen (major axis or lower) stage and a scan optics assembly (minor axis or upper) stage that move orthogonally relative to each other.

A dimensionally stable substrate in the form of granite, or other stone slab, or a slab of ceramic material, cast iron or polymer composite material such as Anocast™, is used as the base for the lower and upper stages. The slab and the stages are preferably fabricated from materials with similar coefficients of thermal expansion to cause the system to advantageously react to temperature changes in a coherent fashion. The substrate is precisely cut ("lapped") such that portions of its upper and lower stage surfaces are flat and parallel to each other. A lower guide track assembly that guides a lower stage carrying a specimen-holding chuck is coupled to a lower surface of the substrate. An upper guide track assembly that guides an upper stage carrying a laser beam focal region control subsystem is coupled to an upper surface of the substrate. Linear motors positioned along adjacent rails of the guide track assemblies control the movements of the lower and upper stages.

The massive and structurally stiff substrate isolates and stabilizes the motions of the laser optics assembly and the specimen, absorbs vibrations and allows for smoother acceleration and deceleration because the supporting structure is inherently rigid. The stiffness of the substrate and close separation of the stage motion axes result in higher frequency resonances and less error in motion along all three axes. The substrate also provides thermal stability by acting as a heat sink. Moreover, because it is designed in a compact configuration, the system is composed of less material and is, therefore, less susceptible to expansion when it undergoes heating. An oval slot cut out of the middle of the substrate exposes the specimen below to the laser beam and allows for vertical motion of the laser optics assembly through the substrate. Otherwise, the specimen is shielded by the substrate from particles generated by overhead motion, except for the localized region undergoing laser processing.

A laser beam focal region control subsystem is supported above the lower stage and includes a vertically adjustable optics assembly positioned with respect to at least one flexure mounted to the upper stage by a support structure. The rigidity of the support structure allows for faster and more accurate vertical motion along the beam axis. The lens supporting sleeve acts as a support for connection to the flexure guiding the vertical motion of the focal region of the laser beam. Vertical motion is initiated by a lens forcer residing at the top end of the sleeve, which imparts a motive force to the optics assembly to adjust its height relative to the workpiece on the lower chuck. As a result, the focal region of the laser is adjusted relative to the work surface. An isolation flexure device, rigid along the beam axis and compliant in the horizontal plane, buffers excess motion of the lens forcer from the optics assembly.

The split-axis stage design is applicable to many platforms used in semiconductor processing including dicing, component trimming, fuse processing, inking, printed wire board (PWB) via drilling, routing, inspection and metrology. The advantages afforded by such a design are also of benefit to a whole class of mechanical machining tools.

In contrast to split-axis stage designs, planar positioning systems can been employed whereby the workpiece is carried on a single stage that is movable by two or more actuators while the tool remains in a substantially fixed position. These systems can translate the workpiece in two dimensions by coordinating the efforts of the actuators.

It would be desirable to attenuate disturbances in a split-axis stage or a planar stage by counteracting force exerted on the structure by the stage motors moving the stage. The force reaction compensation, or frame movement compensation, described herein approaches a problem of counteracting the stage forces on the system frame by placing force reaction compensation motors in the same force plane as the stage motors and as close as possible to the stage motors rather than placing the motors at the base of the system frame, where a large moment arm exists between the stage force plane and the force reaction compensation force plane. This force reaction compensation motor placement strategy eliminates the moment arms between the force reaction compensation motors and the stage motors and allows the force reaction compensation motors to directly couple and react to the stage forces with literally zero moment arms. The elimination of the moment arms between the force reaction compensation and stage motors substantially decreases the parasitic forces that get generated by the distance between the stage motors and the force reaction compensation motors. These parasitic "leftover" forces will cause unwanted disturbances in the system. This force reaction compensation strategy also allows six degrees of freedom to be controlled by only four motors, since the force reaction compensation motors are directly coupled and aligned to the stage motors. The motors used for the force reaction compensation system can be ironless linear motors, of either three phase or single phase configurations.

Figure 2:
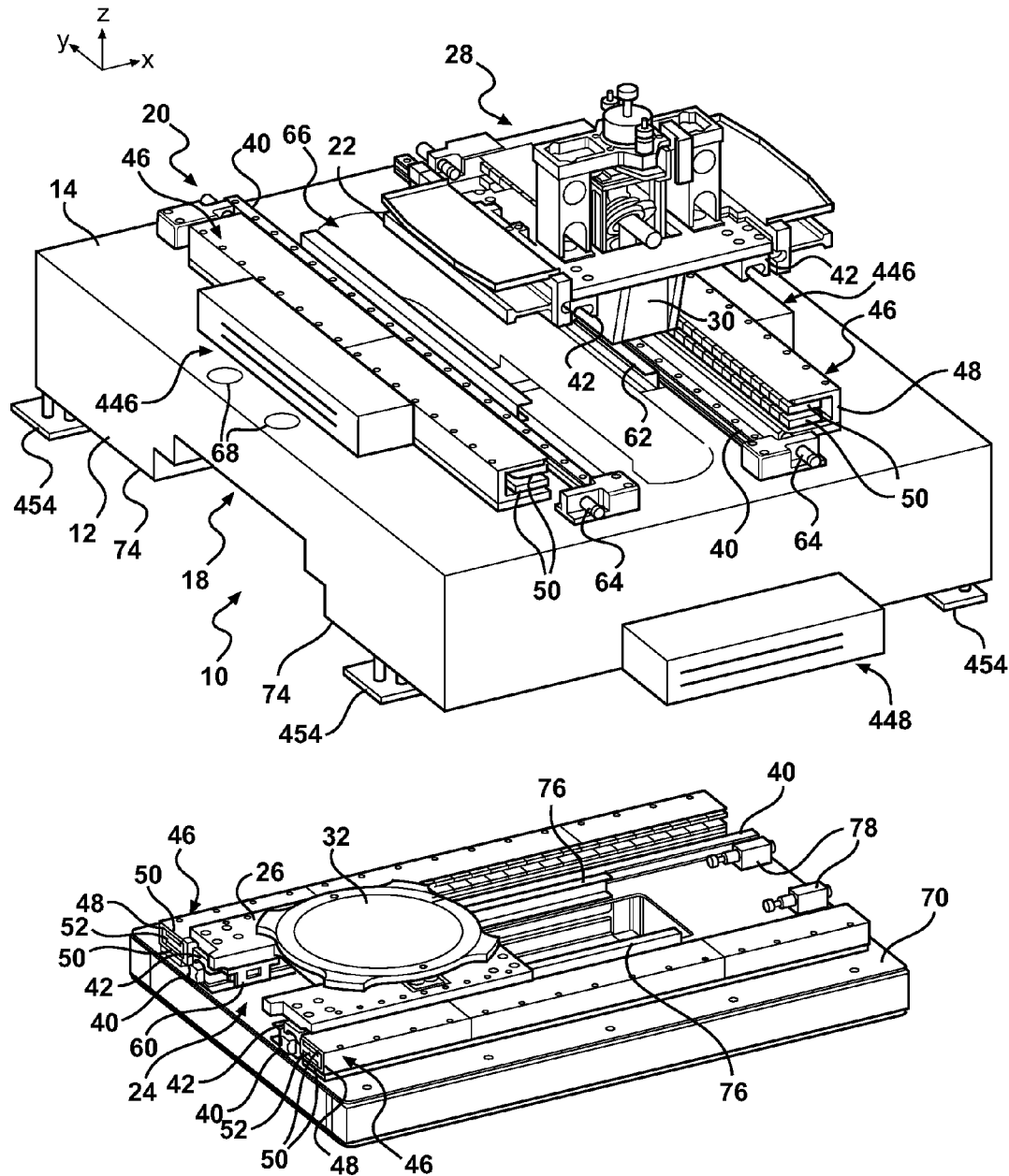
FIG. 2 is a partly exploded isometric view of the force reaction compensation system of FIG. 1, showing upper and lower stages that, when the system is assembled, are mounted to a substrate.

FIGS. 1 and 2 show a multiple stage positioning system 10, which, in one embodiment, can support components of a laser processing system through which a laser beam propagates for incidence on a target specimen. Positioning system 10 includes a dimensionally stable substrate 12 made of a stone slab, preferably formed of granite, or a slab of ceramic material, cast iron, or polymer composite material such as Anocast™. Substrate 12 has a first or upper flat major surface 14 and a second or lower flat major surface 16 with a stepped recess 18. Major surfaces 14 and 16 includes surface portions that are planes extending parallel to each other and conditioned to exhibit flatness and parallelism within about a ten micron tolerance by example.

A portion of upper major surface 14 and a first guide track assembly 20 are coupled to guide movement of a first stage 22, such as a laser optics assembly stage, along a first axis. A surface portion of lower major surface 16 and a second guide track assembly 24 are coupled to guide movement of a second stage 26, such as a specimen stage, along a second axis transverse to the first axis. Of course, first stage 22 and second stage 26 may be any other suitable stage and are not limited to that of laser optics assembly stages or specimen stages. First stage 22 supports a laser beam focal region control subsystem 28, which includes a scan lens 30 that depends downwardly below lower major surface 16 of substrate 12. Second stage 26 supports a specimen-holding chuck 32. The guided motions of stages 22 and 26 move scan lens 30 relative to various laser beam processing locations on a surface of a specimen held by chuck 32.

Substrate 12 is set in place so that major surfaces 14 and 16 define spaced-apart horizontal planes. Guide track assemblies 20 and 24 are positioned so that the first and second axes are perpendicular to each other and thereby define respective Y- and X-axes. This split-axis architecture decouples motion along the X- and Y-axes, simplifying control of positioning the laser beam and chuck 32 with fewer degrees of freedom allowed. In other embodiments, a split-axis architecture for the Z-axis can also be provided with a third guide track assembly for movement of a third stage along a third axis transverse to the first and second axes.

First guide track assembly 20 includes two spaced-apart guide rails 40 secured to portions of upper major surface 14 and two U-shaped guide blocks 42 supported on a bottom surface 44 of first stage 22. Each one of guide blocks 42 fits over and slides along a corresponding one of rails 40 in response to an applied motive force. A motor drive for first stage 22 includes at least one stage or linear motor 46 mounted on upper major surface 14 and along the length of each guide rail 40. Each linear motor 46 imparts the motive force to propel its guide block 42 for sliding movement along its guide rail 40. Each linear motor 46 includes a U-channel magnet track 48 that holds spaced-apart linear arrays of multiple magnets 50 arranged along the length of guide rail 40. A forcer coil assembly 52, positioned between linear arrays of magnets 50, is connected to bottom surface 44 of first stage 22 and constitutes the movable member of linear motor 46 that can move first stage 22. A suitable linear motor 46 is a Model MTH480, available from Aerotech, Inc. of Pittsburgh, Pa.

Each rail guide 40-guide block 42 pair of first guide track assembly 20 can be a rolling element bearing assembly. Alternatives for guide track assembly 20 include a flat air bearing or a vacuum preloaded air bearing. Use of either type of air bearing can entail removal of each guide rail 40, exposing the surface portions of upper surface 14 to form guide surfaces, and substitution for each guide block 42 the guide surface or bearing face of the bearing, which is attached to bottom surface 44 of first stage 22. Vacuum preloaded air bearings, which have a pressure port and a vacuum port, hold themselves down and lift themselves off the guide surface at the same time. Use of vacuum preloaded air bearings needs only one flat guide surface; whereas use of opposed bearing preloading air bearings needs two flat, parallel guide surfaces. Suitable air bearings are available from New Way Machine Components, Inc. of Aston, Pa. Thus, depending on the type of guide track assembly used, surface portions of upper major surface 14 may represent a guide rail mounting contact surface or a bearing face non-contacting guide surface.

A pair of encoder heads 60 secured to bottom surface 44 of first stage 22 and positioned adjacent different ones of guide blocks 42 includes position sensors that can measure yaw angle and distance traveled of first stage 22. Placement of such position sensors in proximity to guide rails 40, guide blocks 42 and linear motors 46 driving each of stages 22 and 26 permits efficient, closed-loop feedback control with minimal resonance effects. A pair of stop members 62 limits the travel distance of guide blocks 42 in response to limit switches included in encoder heads 60 that are tripped by a magnet (not shown) attached to substrate 12. A pair of dash pots 64 dampens and stops the motion of first stage 22 to prevent it from over-travel movement off of guide rails 40.

An oval slot 66, formed in substrate 12 between and along the lengths of guide rails 40, provides an opening within which scan lens 30 travels as first stage 22 moves along guide rails 40. A pair of through apertures 68, formed in the region of stepped recess 18 in substrate 12, can provide operator service access from upper surface 14 to encoder heads 60 to maintain their alignment.

A second guide track assembly 24 includes guide rails 40, U-shaped guide blocks 42, linear motors 46, U-channel magnet tracks 48, magnets 50, forcer coil assemblies 52 and encoder heads 60 that correspond to those described above in connection with first guide track assembly 20. Linear motors 46 and the components of and supported by second guide track assembly 24 are mounted on a surface 70 of a stage bed 72.

The mechanical arrangement of stages 22 and 26 and motors 46 can result in reduced pitch and roll of stages 22 and 26 and can enhance accuracy of high velocity motion. Symmetric placement of motors 46 on opposite sides of stages 22 and 26 improves control of yaw. The placement of motors 46 along the sides of stages 22 and 26 can minimize thermal disturbance of critical components and position sensors.

Second guide track assembly 24 and second stage 26 support chuck 32 that fits into and is secured within stepped recess 18. Second stage 26 can also support any other clamp, component or device as desired or required. Surface 70 of stage bed 72 is secured against a surface portion 74 of lower major surface 16 adjacent stepped recess 18. Chuck 32 is positioned below the innermost portion of stepped recess 18 of lower major surface 16 and can move beneath it in response to the motive force imparted by linear motors 46 moving second stage 26 along second guide track assembly 24. Chuck 32 can also be positioned on second stage 26 in any other suitable manner. A pair of stop members 76 limits the travel distance of guide blocks 42 in response to limit switches included in encoder heads 60 that are tripped by a magnet (not shown) attached to substrate 12. A pair of dashpots 78 dampens and stops the motion of second stage 26 to prevent it from over-travel movement off of guide rails 40.

An alternative to guide track assembly 24 is a magnetic preloaded air bearing using stage bed 72 as a bearing land or guideway. As described in additional detail above, use of a magnetic preloaded air bearing entails removal of each guide rail 40, exposing the surface portions of stage bed 72, removal of each guide block 42 and providing on the bottom surface of second stage 26 space for mounting the air bearing with its (porous) bearing face positioned opposite the exposed surface portions. Additional details of this multiple stage position system 10 can be had by referring to U.S. Patent Publication No. 2008/0198485, which is assigned to the Assignee of the present invention and is incorporated herein in its entirety by reference.

Still referring to FIGS. 1 and 2, two force reaction compensation (FRC) motors or disturbance-attenuation mechanisms 446 are positioned in the same force plane as stage motors 46 of first guide track assembly 20 for counteracting forces exerted on first stage 22 by stage motors 46 moving first stage 22. In particular, FRC motors 446 are aligned with the Y-axis force plane. Two FRC motors or disturbance-attenuation mechanisms 448 are also positioned in the same force plane as stage motors 46 of second guide track assembly 24 for counteracting forces exerted on second stage 26 by stage motors 46 moving second stage 26. Accordingly, FRC motors 448 are aligned with the X-axis force plane. Motor magnets 450 of FRC motors 446 and 448 are attached to substrate 12. In operation, motor coils 452 of FRC motors 446 and 448 can be attached to the system frame (not shown). Motor coils 452 can be attached to ground through the system frame.

FRC motors 446 and 448 are located are as close as possible to stage motors 46 of first guide track assembly 20 and second guide track assembly 24, respectively. This placement strategy reduces or eliminates respective moment arms between FRC motors 446, 448 and stage motors 46. The placement allows each FRC motor 446, 448 to directly couple and react to the corresponding stage forces with virtually or literally zero moment arm. This reduction or elimination substantially decreases the parasitic forces generated by the distance between the individual stage motors 46 and corresponding FRC motor 446, 448. The parasitic forces can cause unwanted disturbances in the system. The force reaction compensation system allows six degrees of freedom to be controlled by only four FRC motors (two FRC motors 446 and two FRC motors 448), since FRC motors 446, 448 are directly coupled and aligned to stage motors 46. FRC motors 446, 448 can be ironless linear motors of either single-phase or three-phase configuration and are controlled in a like manner to that described with respect to stage motors 46 according to control algorithms that can be programmed by those skilled in the art based on the teachings herein regarding placement of the FRC motors 446, 118 and the particular stage design used.

Additionally, four vibration isolators 454 are attached to the four corners of lower major surface 16 of substrate 12 and can be mounted to the system frame. Vibration isolators 454 isolate stages 22 and 26 from environmental vibrations and disturbances.

Figure 3:
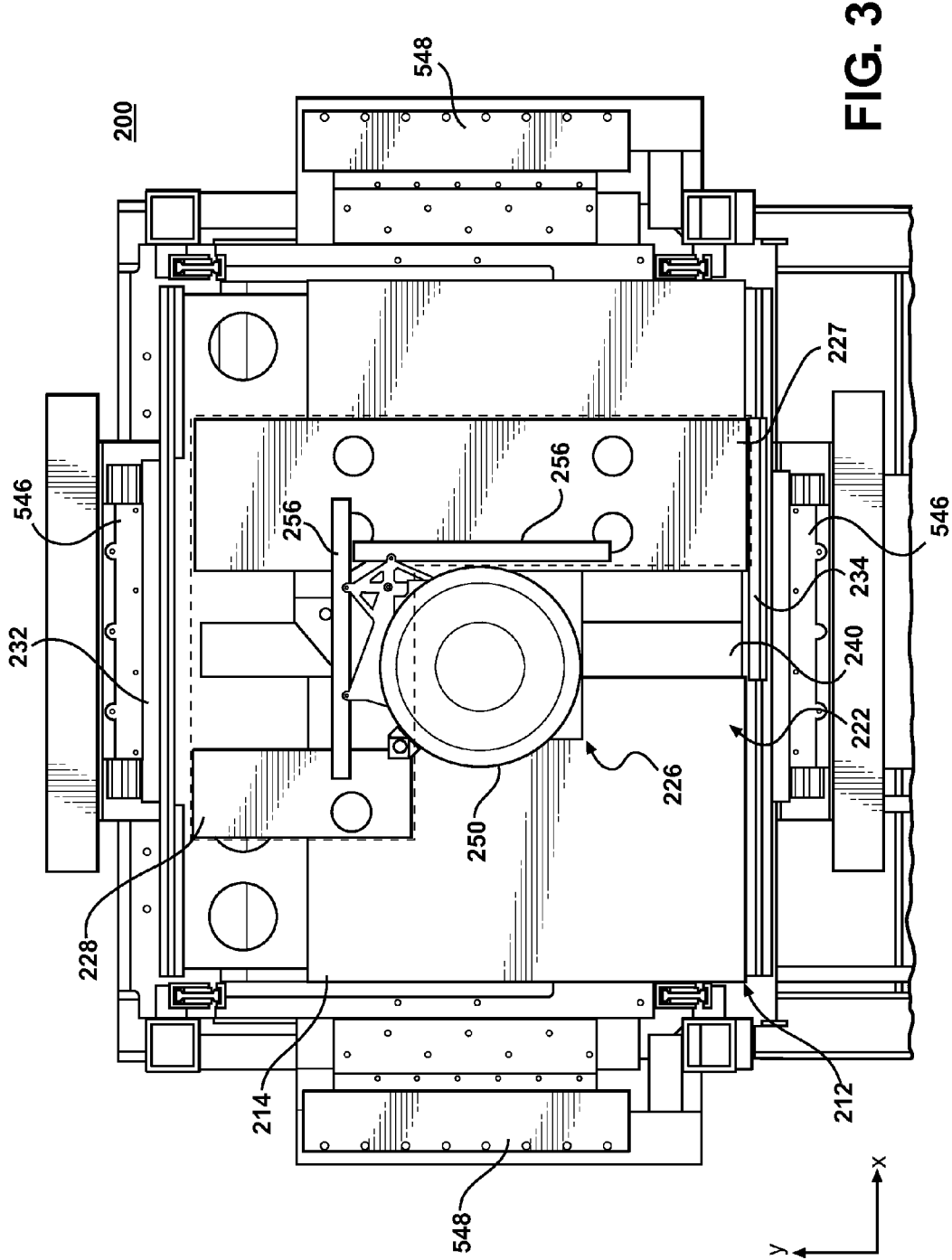
FIG. 3 is a simplified plan view of a force reaction compensation system according to another embodiment of the invention.
Figure 4:
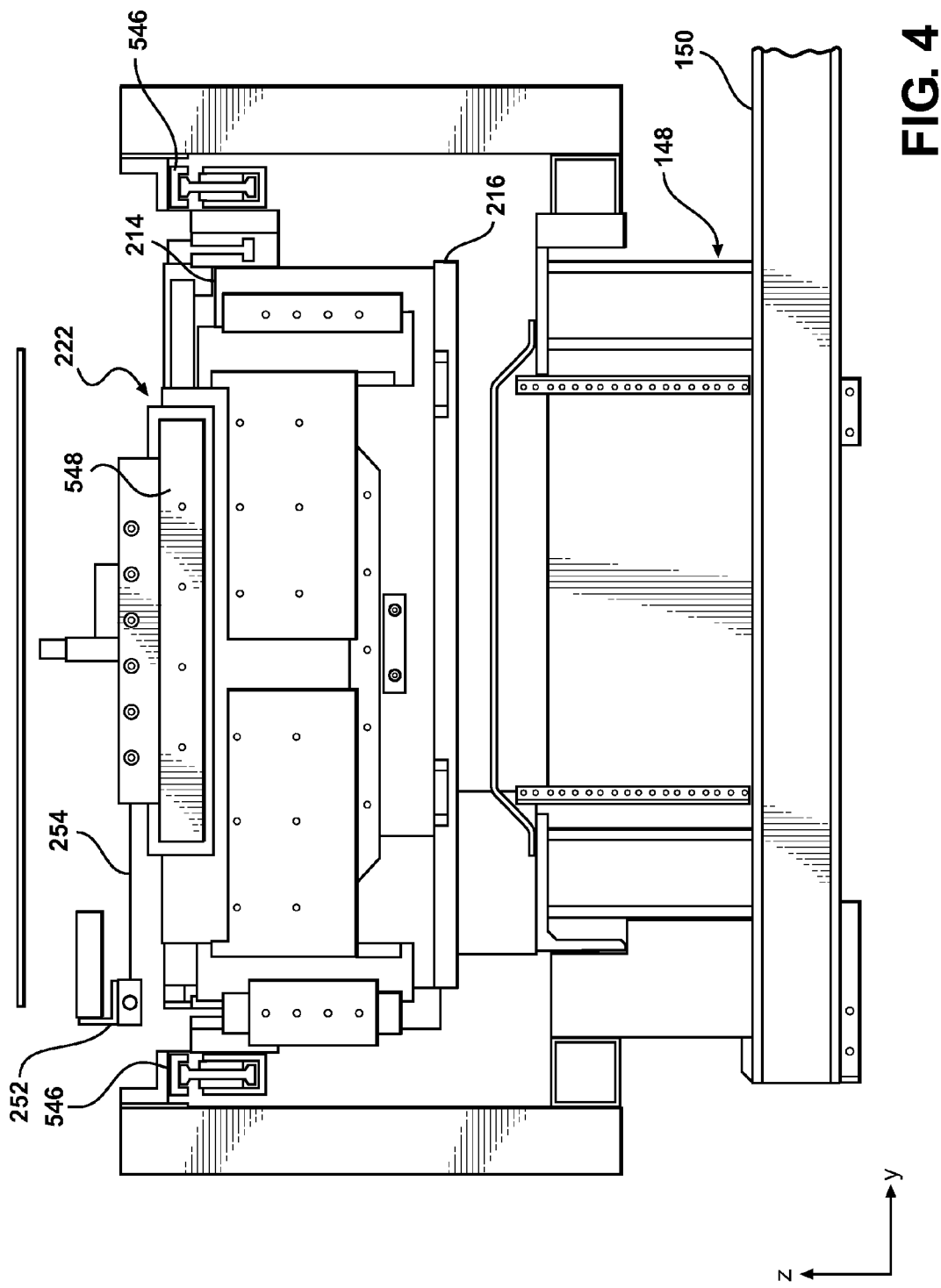
FIG. 4 is a simplified side elevation view of the force reaction compensation system of FIG. 3.
Figure 5:
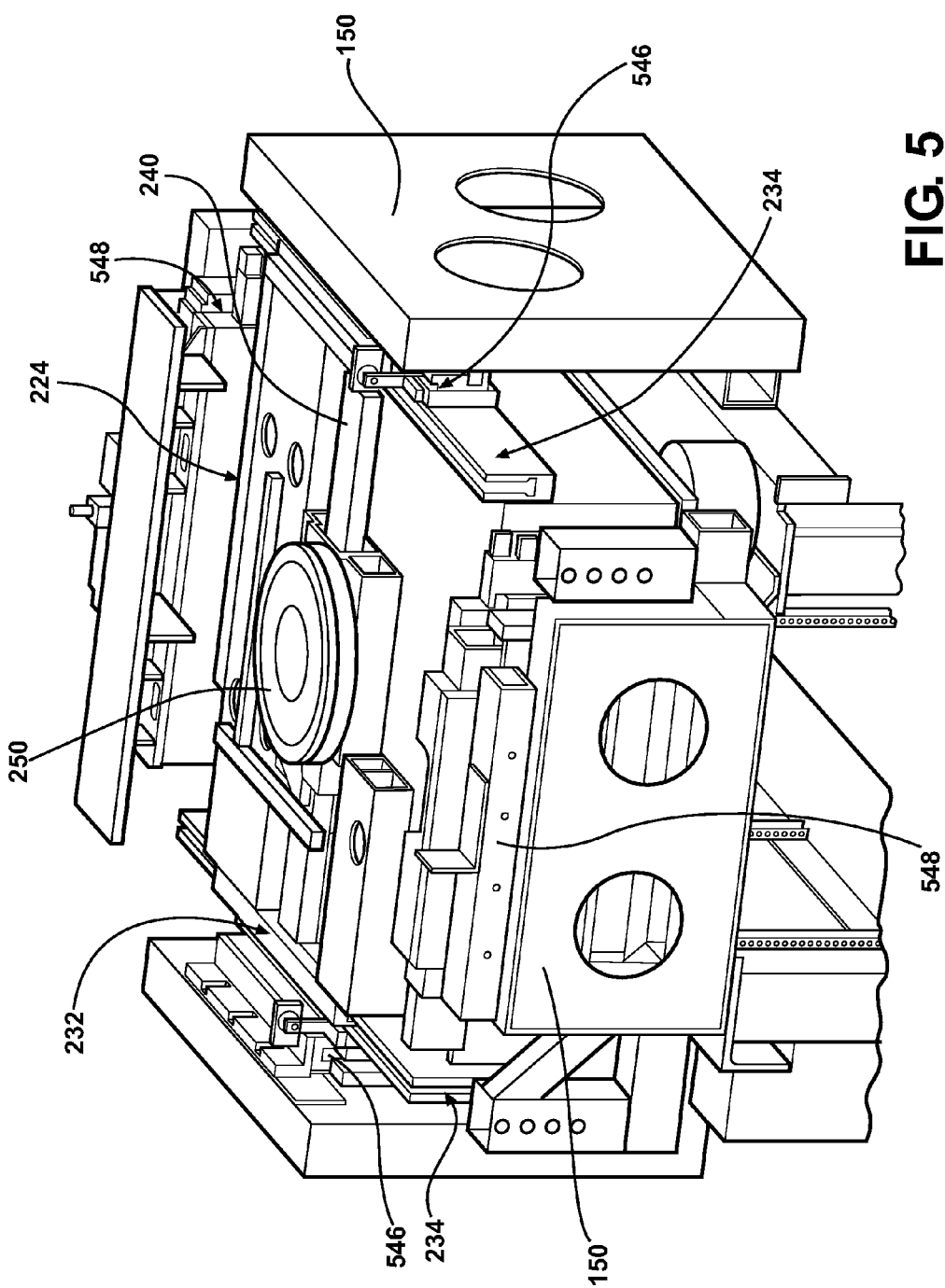
FIG. 5 is a simplified perspective view of the force reaction compensation system of FIGS. 3 and 4.

FIGS. 3-5 show a positioning system 200 according to another embodiment of the invention. Positioning system 200 includes a substrate 212 made of a material (e.g., granite) similar to that described in connection with substrate 12 of FIG. 1. Substrate 212 has a first or upper surface 214 and a second or flat surface 216. Surfaces 214 and 216 include surface portions that are planes extending parallel to each other.

Positioning system 200 is a planar positioning system in which a workpiece (not shown) is carried on a single stage 222 that is movable by a major axis 224 and a minor axis 226. Such systems can translate the workpiece in two dimensions by coordinating the efforts of major axis 224 and minor axis 226. Some planar positioning systems may also be capable of rotating the workpiece, although that may not be necessary or desirable.

In this embodiment, minor axis 226 is attached to major axis 224. In other embodiments, minor axis 226 can be detached and independent from major axis 224. Major axis 224 is an L-shaped structure (see dotted outline in FIG. 3) that includes a longer portion 227 and a shorter portion 228.

Figure 6A:
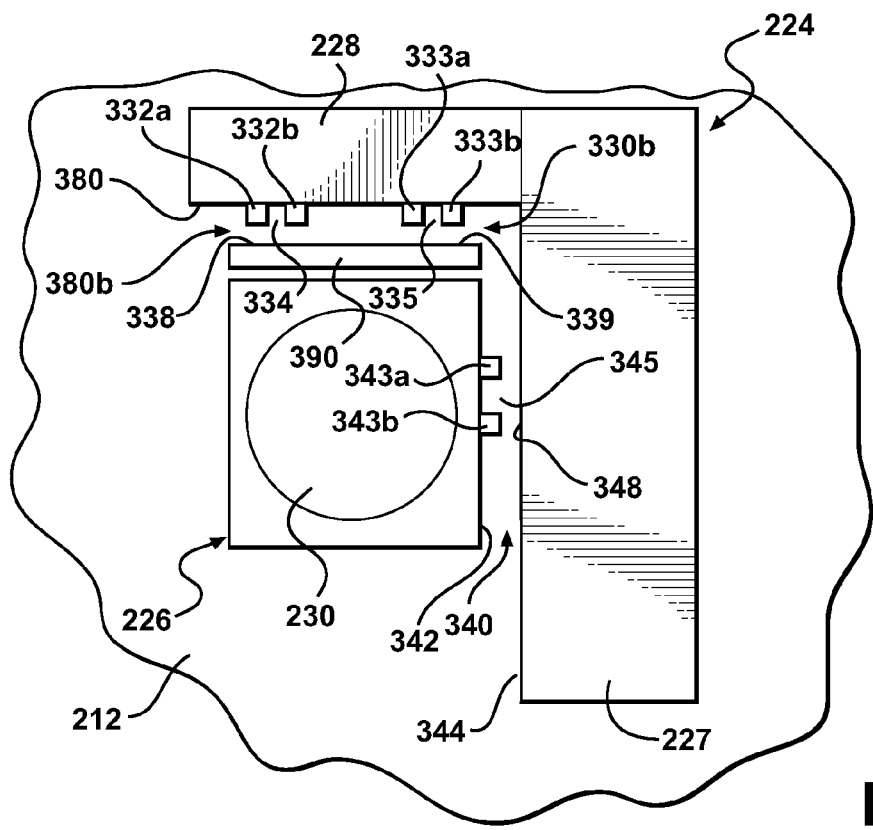
FIG. 6A is a simplified schematic plan view of a portion of the force reaction compensation system of FIGS. 3-5.
Figure 6B:
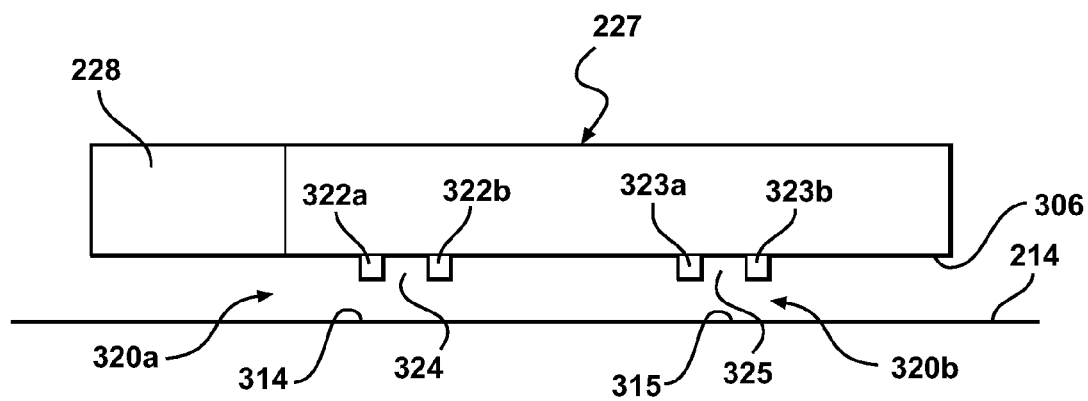
FIG. 6B is a simplified side elevation view of a portion of the force reaction compensation system of FIGS. 3-5.

Referring to FIGS. 6A and 6B, two spaced-apart vacuum preloaded air bearings 320a and 320b are fixed to a bottom surface 306 of the L-shaped structure. In particular, in this embodiment, air bearings 320a and 320b are fixed to longer portion 227 of major axis 224. Air bearings 320a and 320b simultaneously hold themselves down and lift themselves off bearing guideways 314 and 315, respectively, on upper surface 214.

Air bearing 320a has a pressure land divided into spaced-apart land portions 322a and 322b. A vacuum area 324 is located between each of land portions 322a and 322b. The simultaneous application and distribution of air pressure and vacuum pressure creates a thin film of air in space between the pressure land portions 322a and 322b of air bearing 320a and bearing guideway 314 on surface 214. Similarly, air bearing 320b has a pressure land divided into spaced-apart land portions 323a and 323b. A vacuum area 325 is located between each of land portions 323a and 323b. The simultaneous application and distribution of air pressure and vacuum pressure creates a thin film of air in space between the pressure land portions 323a and 323b of air bearing 320b and bearing guideway 315 on surface 214.

Two spaced-apart vacuum preloaded air bearings 330a and 330b are also fixed to an inner surface 380 of shorter portion 228 of the L-shaped structure. Air bearings 330a and 330b simultaneously hold themselves down and lift themselves off bearing guideways 338 and 339, respectively, on a vertical side surface 390 of substrate 212. Similar to air bearings 320a and 320b, air bearing 330a has a pressure land that is divided into spaced-apart land portions 332a and 332b. A vacuum area 334 is located between each of land portions 332a and 332b. The simultaneous application and distribution of air pressure and vacuum pressure creates a thin film of air in space between the pressure land portions 332a and 332b of air bearing 330a and bearing guideway 338 on side surface 390. Further, air bearing 330b has a pressure land that is divided into spaced-apart land portions 333a and 333b. A vacuum area 335 is located between each of land portions 333a and 333b. The simultaneous application and distribution of air pressure and vacuum pressure creates a thin film of air in space between the pressure land portions 333a and 333b of air bearing 330b and bearing guideway 339 on side surface 390. Accordingly, air bearings 330a and 330b guide major axis 224 along its axis of motion ("X-axis").

Referring to FIG. 3, stage motors, here linear motors 232 and 234, impart the motive force that results in nearly zero friction motion of both shorter portion 228 and longer portion 227 of major axis 224 along the lengths of the bearing guideways. Each linear motor 232, 234 can include a magnet track that holds spaced-apart linear arrays of magnets and is attached to substrate 212. A copper coil portion of linear motor 232, positioned between the linear arrays of magnets, can be connected to shorter portion 228 of major axis 224. A copper coil portion of linear motor 234, positioned between the linear arrays of magnets, can be connected to longer portion 227 of major axis 224. Together, the copper coil portions of linear motors 232 and 234 constitute the movable members that can move major axis 224. Suitable linear motors 232, 234 are Model MTH480, available from Aerotech, Inc. of Pittsburgh, Pa.

Referring again to FIG. 6A, minor axis 226 is attached to major axis 224 via a vacuum preloaded air bearing 340. Air bearing 340 is located along a vertical side surface 342 of minor axis 226 and interfaces a vertical side surface 344 of longer portion 227. Like major axis 224, minor axis 226 is also driven by a linear motor 240 (see FIG. 3). Air bearing 340 simultaneously holds itself down and lifts itself off bearing guideway 348 on vertical side surface 344. Air bearing 340 has a pressure land that is divided into spaced-apart land portions 343a and 343b. A vacuum area 345 is located between land portions 343a and 343b. The simultaneous application and distribution of air pressure and vacuum pressure creates a thin film of air in space between the pressure land portions 343a, 343b of air bearing 340 and bearing guideway 348 on vertical side surface 344.

A suitable air bearing for air bearings 320a, 320b, 330a, 330b and 340 is a vacuum preloaded air bearing series Part No. S20xxxx, available from New Way Machine Components, Inc. of Aston, Pa. Of course, in other embodiments, air bearings 320a, 320b, 330a, 330b and 340 may be replaced by flat air bearings, rolling element bearing assemblies, magnetic preloaded air bearings or any other suitable alternative.

Linear motor 240 can include a magnet track that holds spaced-apart linear arrays of magnets attached to major axis 224. Specifically, in this embodiment, linear motor is attached to both shorter portion 227 and longer portion 228 of major axis 224. A copper coil portion of linear motor 240, positioned between the linear arrays of magnets, can be connected to minor axis 226. The copper coil portion of linear motor 240 constitutes the movable member that can move minor axis 226.

As best seen in FIGS. 3-5, a chuck 250 supports the workpiece while a laser interferometer 252 reflects a laser beam 254 off of mirrors 256. Laser beam 254 remains in a substantially fixed position while system 200, as discussed previously, translates chuck 250 in two dimensions by coordinating the efforts of major axis 224 and minor axis 226. In other embodiments, the major and minor axis 224, 226 can remain in a fixed position while the laser beam 254 is translated.

Two FRC motors or disturbance-attenuation mechanisms 546 are positioned in the same force plane as stage motors 232 and 234 for counteracting forces exerted on stage 222 by stage motors 232 and 234 moving major axis 224. In particular, FRC motors 546 are aligned with the X-axis force plane. Further, two FRC motors or disturbance-attenuation mechanisms 548 are also positioned in the same force plane as stage motor 240 for counteracting forces exerted on stage 222 by stage motors 240 moving minor axis 226. FRC motors 548 are aligned with the Y-axis force plane. FRC motors 546 are located as close as possible to stage motors 232 and 234, and FRC motors 548 are located as close as possible to stage motor 240. This placement strategy reduces or eliminates the moment arms between FRC motors 546 and stage motors 232 and 234 and between FRC motors 548 and stage motor 540. The placement allows each FRC motor 546, 548 to directly couple and react to the corresponding stage forces with virtually or literally zero moment arms. The elimination of moment arms substantially decreases the parasitic forces generated by the distance between individual stage motors 232 and 234 and corresponding FRC motors 546 and individual stage motor 240 and corresponding FRC motors 548. The parasitic forces can cause unwanted disturbances in the system. The force reaction compensation system allows six degrees of freedom to be controlled by only four FRC motors 546, 548, since FRC motors 546 are directly coupled and aligned with stage motors 232 and 234 and since FRC motors 548 are directly coupled and aligned with stage motor 240. FRC motors 546, 548 are spaced from a base 148 of a system frame 150. FRC motors 546, 548 can be ironless linear motors of either single-phase or three-phase configuration.

Several examples of possible types of laser processing systems in which positioning system 10 or 200 or any other embodiment of the present invention can be installed include semiconductor wafer or other specimen micromachining, dicing and fuse processing systems. In a wafer dicing system, a laser beam moves along scribe locations on the wafer surface. In a wafer fuse processing system, a pulsed laser beam moves relative to wafer surface locations of fuses to irradiate them such that the laser pulses either partly or completely remove fuse material.

It should be recognized that embodiments of the present invention can be embodied in a single-stage configuration, a dual-stage configuration or a three-stage configuration without departing from the spirit or scope of this disclosure. Furthermore, it should be recognized that the present invention can be embodied in one or more stages, i.e., in all stages or less than all stages of a single-stage, dual-stage or three-stage configuration, without departing from the spirit or scope of this disclosure.

Referring now to FIG. 7, an illustration of force compensation motor locations on commercially-available stage designs is provided. This illustration demonstrates the non-planar placement of compensation motors (MC) with respect to the individual stage motors (MS) used in commercially available stage designs. This placement in commercially-available stage designs can lead to the generation of parasitic forces causing unwanted disturbances in the system due to the existence of moment arms between the compensation motors MC located spaced from the corresponding plane of movement of the individual stages and the corresponding stage motors MS driving the individual stages. This configuration typically requires additional compensation motors to control six degrees of freedom of movement for the combined stages leading to higher cost, increased maintenance and complexity of the system.

Figure 8:
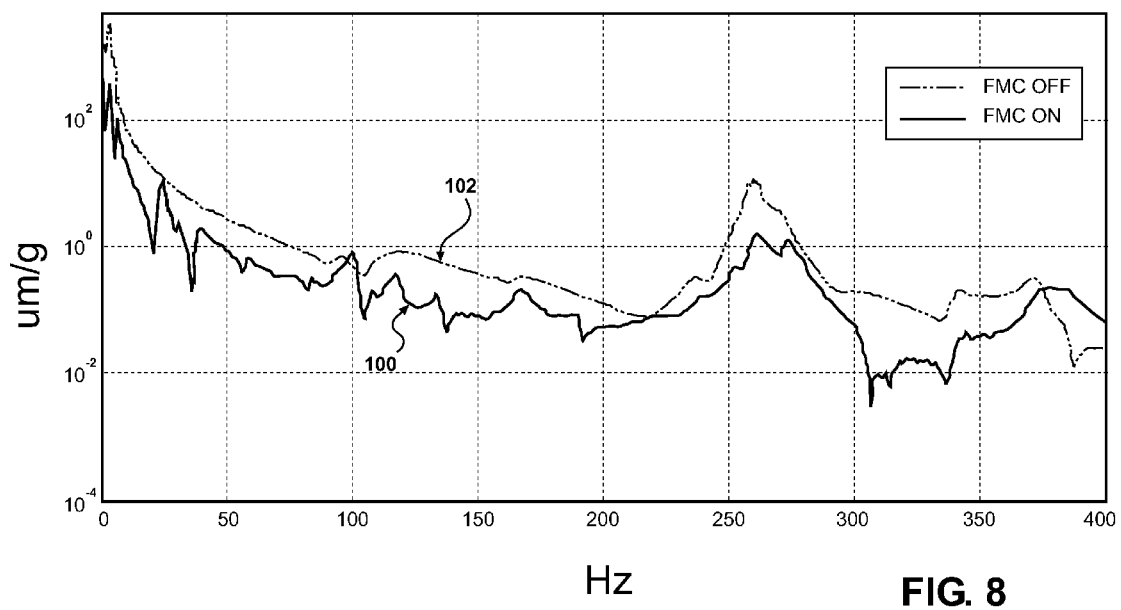
FIG. 8 is a graph comparing test data of system disturbance attenuation with frame movement compensation according to one embodiment of the invention turned on and another with the frame movement compensation turned off.

Referring now to FIG. 8, an illustration of test data comparing system disturbance attenuation with force reaction compensation according to one embodiment of the invention. Graph line 100 represents test data with compensation turned on, and graph line 102 represents test data with the force reaction compensation turned off.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A laser processing system, comprising:
a chuck;
a positioning system having at least one stage motor;
a substrate having two major surfaces parallel to each other and conditioned to exhibit flatness;
a laser beam that propagates along a beam axis for incidence on a target specimen mounted on the chuck, the chuck operatively connected to the positioning system, and the at least one stage motor mounted to the substrate and connected to the positioning system to move at least one of the laser beam and the target specimen relative to each other to position the laser beam at selected locations on the target specimen; and
at least one force reaction compensation motor placed in a common force plane with a corresponding stage motor, thereby reducing any moment arm between the at least one force reaction compensation motor and the corresponding stage motor and allowing the force reaction compensation motor to directly couple and react to stage forces with virtually zero moment arm;
wherein the at least one force reaction compensation motor is mounted to the substrate at a position further away from a center of the substrate than the corresponding stage motor.

2. The laser processing system of claim 1 wherein the at least one force reaction compensation motor is located as close as possible to the corresponding stage motor.

3. The laser processing system of claim 1 wherein the at least one force reaction compensation motor is spaced from a base of a system frame.

4. The laser processing system of claim 1 wherein the at least one force reaction compensation motor further comprises:

only four force reaction compensation motors for controlling six degrees of freedom, such that the force reaction compensation motors are directly coupled and aligned to the stage motors.

5. The laser processing system of claim 1 wherein the at least one force reaction compensation motor is an ironless motor.

6. The laser processing system of claim 1 wherein the at least one force reaction compensation motor is a linear motor.

7. The laser processing system of claim 1 wherein the at least one force reaction compensation motor is a single-phase motor.

8. The laser processing system of claim 1 wherein the at least one force reaction compensation motor further comprises:
a force reaction compensation motor selected from a group consisting of an ironless motor, a linear motor, an ironless linear motor, a single-phase motor, a three-phase motor, an ironless single-phase motor, an ironless three-phase motor, a linear single-phase motor, a linear three-phase motor, an ironless linear single-phase motor, and an ironless linear three-phase motor.

9. The laser processing system of claim 1 wherein on a condition that the at least one stage motor moves the laser beam, the positioning system includes at least one other stage motor that moves target specimen; and on a condition that the at least one stage motor moves the target specimen, the positioning system includes at least one other stage motor that moves the laser beam.

10. The laser processing system of claim 1 wherein each stage motor includes a magnet track mounted on a surface of the substrate and a coil assembly coupled to move the laser beam or the target specimen relative to the substrate; and
wherein each force reaction compensation motor includes motor magnets attached to the substrate and motor coils attached to a frame of the laser processing system.

11. The laser processing system of claim 1 wherein each stage motor includes a fixed portion mounted on a surface of the substrate and a movable member coupled to move the laser beam or the target specimen relative to the substrate; and
wherein the at least one force reaction compensation motor includes at least a first force reaction compensation motor and a second force reaction compensation motor, each of the first force reaction compensation motor and the second force reaction compensation motor including respective motor magnets and respective motor coils; and
wherein at least one of the first force reaction compensation motor or the second force reaction compensation motor is spaced apart from the corresponding stage motor.

12. A laser processing method, comprising:
propagating a laser beam along a beam axis for incidence on a target specimen mounted on a chuck, the chuck operatively connected to a positioning system having at least one stage motor mounted to a substrate and connected to the positioning system to move at least one of the laser beam and the target specimen relative to each other to position the laser beam at selected locations on the target specimen, the substrate having two major surfaces parallel to each other and conditioned to exhibit flatness;
locating at least one force reaction compensation motor in a common force plane as a corresponding stage motor, thereby reducing any moment arm between the at least one force reaction compensation motor and the corresponding stage motor and allowing the at least one force reaction compensation motor to directly couple and react to stage forces with virtually zero moment arm;
wherein the at least one force reaction compensation motor is mounted to the substrate at a position further away from a center of the substrate than the corresponding stage motor.

13. The laser processing method of claim 12, further comprising:
locating the at least one force reaction compensation motor as close as possible to the corresponding stage motor.

14. The laser processing method of claim 12, further comprising:
spacing the at least one force reaction compensation motor from a base of a system frame.

15. The method of claim 12 wherein the at least one force reaction compensation motor comprises only four force reaction compensation motors, the method further comprising:
controlling six degrees of freedom with the only four force reaction compensation motors, each of the only four force reaction compensation motors directly coupled to and aligned with the corresponding stage motor.

16. The method of claim 12 wherein the at least one force reaction compensation motor comprises at least one ironless force reaction compensation motor.

17. The method of claim 12 wherein the at least one force reaction compensation motor comprises at least one linear force reaction compensation motor.

18. The laser processing method of claim 12 wherein each stage motor includes a magnet track mounted on a surface of the substrate and a coil assembly coupled to move the laser beam or the target specimen relative to the substrate; and
wherein the at least one force reaction compensation motor includes at least two force reaction compensation motors, each including respective motor magnets and respective motor coils and wherein a force reaction compensation motor of the at least two force reaction compensation motors is spaced apart from each of the stage motors.

19. In a laser processing system in which a laser beam propagates along a beam axis for incidence on a target specimen mounted on a support, the support operatively connected to a positioning system having at least one planar stage and at least one stage motor that moves at least one of the laser beam and the target specimen relative to each other to position the laser beam at selected locations on the work surface, the improvement comprising:
at least one disturbance-attenuation mechanism for counteracting forces exerted on the at least one planar stage by the at least one stage motor moving the planar stage, the at least one mechanism located in a common force plane with a corresponding stage motor, and as close as possible to the corresponding stage motor, thereby reducing any moment arm between the at least one mechanism and the corresponding stage motor and allowing the at least one mechanism to directly couple and react to stage forces with virtually zero moment arm;
wherein on a condition that the at least one stage motor moves the laser beam, the positioning system includes at least one other stage motor that moves target specimen; and on a condition that the at least one stage motor moves the target specimen, the positioning system includes at least one other stage motor that moves the laser beam;
a substrate having two major surfaces parallel to each other and conditioned to exhibit flatness;

wherein each stage motor includes a fixed portion mounted on a surface of the substrate and a movable member coupled to move the laser beam or the target specimen relative to the substrate; and wherein the at least one disturbance-attenuation mechanism includes at least a first disturbance-attenuation mechanism and a second disturbance-attenuation mechanism, each of the first disturbance-attenuation mechanism and the second disturbance-attenuation mechanism including respective motor magnets and respective motor coils.

\* \* \* \* \*